United States Patent [19]

Ohrendorf et al.

[11] Patent Number: 4,479,512
[45] Date of Patent: Oct. 30, 1984

[54] CONTINUOUS CONTROL VALVE WITH ROTARY OR AXIAL SLIDE

[75] Inventors: Johannes Ohrendorf, Freudenberg-Plittershagen; Harald Wagner, Kreuztal-Fellinghausen, both of Fed. Rep. of Germany

[73] Assignee: Elektro-Mechanik GmbH, Fed. Rep. of Germany

[21] Appl. No.: 357,333

[22] Filed: Mar. 11, 1982

[30] Foreign Application Priority Data

Nov. 3, 1981 [DE] Fed. Rep. of Germany ....... 3109116
Nov. 3, 1981 [DE] Fed. Rep. of Germany ... 8106808[U]

[51] Int. Cl.³ .......................................... F16K 11/085
[52] U.S. Cl. ..................... 137/625.17; 137/625.22; 137/625.23; 137/625.68
[58] Field of Search ............... 137/625.22, 625.23, 137/625.69, 625.68, 625.17, 625.24; 91/575 R, 625.21

[56] References Cited

U.S. PATENT DOCUMENTS

| | | | |
|---|---|---|---|
| 2,312,941 | 3/1943 | Tucker | 137/625.22 X |
| 2,814,309 | 11/1957 | Koenig | 137/625.23 |
| 2,907,349 | 10/1959 | White | 137/625.23 |
| 3,556,155 | 1/1971 | Morris | 137/625.69 |
| 4,143,676 | 3/1979 | Ivony | 137/625.23 |

*Primary Examiner*—Alan Cohan
*Attorney, Agent, or Firm*—McGlew and Tuttle

[57] ABSTRACT

A continuous control valve is disclosed which comprises a casing having a cylindrical cavity therein with two pairs of ports extending therethrough. Each port has a preferably square opening communicating with the cavity. A cylindrical valve slide is movable both axially and rotatably in the casing cavity. The valve slide includes a pair of rectangular cross section grooves which have control edges movable with respect to limiting edges of the port openings to vary the cross sectional area of the port openings opening into the groove. Each groove is shallow in the vicinity of inlet and outlet port openings and deeper in the vicinity of additional port openings in the casing. The cylindrical valve is movable either axially or rotationally in a controlled direction to vary the cross-sectional area of the passages and also movable into a selected position to establish a selected overlap between the control edges of the valve slide and the limiting edges of the port openings.

11 Claims, 12 Drawing Figures

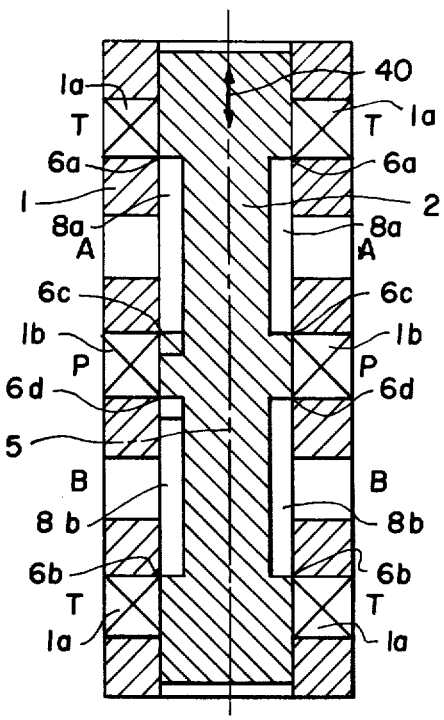
FIG. 5
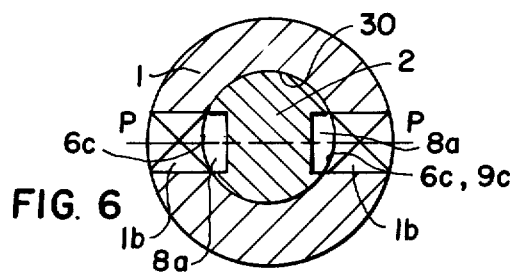
FIG. 5a
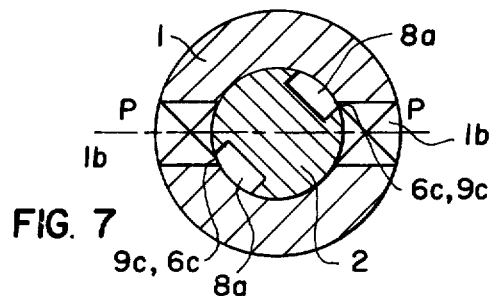
FIG. 6
FIG. 7

CONTINUOUS CONTROL VALVE WITH ROTARY OR AXIAL SLIDE

FIELD AND BACKGROUND OF THE INVENTION

The present invention relates in general to continuous control valves and in particular to a new and useful continuous control valve in which various flow rate displacement characteristics are adjustable and in which a definite rate of flow of hydraulic fluid under a definite pressure is continuously controllable in accordance with a continuously and smoothly rising flow force to flow rate characteristic.

Continuous control valves, particularly those comprising a cylindrical body or slide in which grooves with a rectangular cross section are provided, are known both in the rotary slide and the lengthwise or axial slide design (for example of rotary slide see German OS No. 27 30 652; and for lengthwise slide see German OS No. 24 04 524). Usually, and unlike in the last mentioned reference, the rectangular grooves extend in their length, parallel to the axis of the slide casing and to the axis of symmetry of the cylindrical slide coinciding therewith. The length of the grooves is determined by the spacing of the inside openings of adjacent ports. In a four-way valve, two grooves are needed which extend on diametrally opposite sides of the cylindrical slide.

It is further known (from British patent No. 134,759 FIGS. 1 and 2, and from U.S. Pat. No. 3,477,472, FIG. 1) to provide the control piston of control valves with a step in order to reduce the flow forces, or to provide such a step close to the control edge of the control piston. Continuous control valves of the above mentioned kind are type provide means for a continuous control in most various applications. These control means become increasingly important as transducers or transformers, and at the same time amplifiers, in a so called pneumo-hydraulic control system. This system has been developed in the paper and textile industries for controlling the run of material web edges or center lines. The basic element of this system is a pneumo-hydraulic controller, comprising a pneumo-hydraulic transformer and a unit for supplying pressure oil and compressed air.

The pneumo-hydraulic transformer, designed as a servo-valve, comprises a double-diaphragm which is exposed to a differential pressure corresponding to the deviation from a desired position, for example, of a web edge. Under the differential pressure, a diaphragm drive executes a lengthwise stroke and causes a corresponding rotary motion of the rotary slide of the servo-valve, whereby a working oil flow is continuously controlled to reduce the deviation of the web through an actuator.

A valve for continuous control or a continuous control valve designed and employed as a part of a pneumo-hydraulic transformer or for other purposes, has a definite flow rate-displacement characteristic determining the control characteristic. Therefore, to obtain continuous control valves with varying characteristics, the slide and/or slide casing must be manufactured in various sizes. This entails the necessity of manufacturing many valve sets in small numbers since valves of this kind are sometimes needed with a rotary slide and other times with a lengthwise slide and with considerably differing characteristics. On the other hand, if a continuous control valve is designed as a pneum-hydraulic transformer, its property and function as an amplifier is also utilized, to be able to control a hydraulic power output (output of the continuous control valve) which is greater than, for example, the force actuating the rotary slide (input power). The mentioned diaphragm drive of the pneumo-hydraulic transformer designed as a servo valve has only a small actuating power, so that the power input of the servo valve is small.

Continuous control valves in which steps, similar to those of the above mentioned prior art are provided at the flow entrance, downstream of the control edges, for compensating or reducing the hydraulic flow force, are already commercially available and employed. At these steps, a "compensating force" acting against the flow force tending to close the valve is produced, so that a smaller force for controlling the slide and a smaller control power input are needed than in valves without a flow force reduction, provided that the considered power output is identical. Prior art methods of reducing the flow force in valves are not satisfactory in this regard.

SUMMARY OF THE INVENTION

The present invention is directed to a continuous control valve, particularly for a pneumatic transformer, in which various flow rate-displacement characteristics are adjustable and with which a definite rate of flow of hydraulic fluid under a definite pressure is continuously controllable in accordance with a continuously and monotonously rising flow force to flow rate characteristic.

Accordingly, an object of the present invention is to provide a continuous control valve comprising, a casing having a valve slide cavity and a plurality of ports each with an opening communicating with said cavity, each port opening bounded by a plurality of limiting edges. At least one of the ports is an inlet port and at least one other of the ports is an outlet port with additional ports provided for flow in the cavity from the inlet port and to the outlet port. A valve slide is provided and movable in the cavity in a control direction to vary a flow passage cross sectional area in each port opening.

The slide has a plurality of grooves each with, for instance, a rectangular cross section and a control plane transverse to the plane containing the control direction, a pair of control edges extending transverse to the control direction and a pair of connecting edges connecting ends of the control edges. The slide is movable in the control direction to move the control edges past at least some of the limiting edges. This slide is also positionable in the cavity in a selected position in a direction transverse to the control direction to vary an amount of overlap between the control edges and the limiting edges. The grooves are shallow in the vicinity of the inlet and outlet ports and wider in the vicinity of the additional port with an angle between the grooves and an outer surface of the slide being acute in the vicinity of the outlet port.

A further object of the invention is to provide a control valve wherein the valve slide is cylindrical and the control direction comprises rotation of the valve slide, the control edges being parallel to an axis of the cylindrical valve slide and to at least some limiting edges also being parallel to the axis, the slide being positionable at a selected axial location with respect to the casing to provide the selected amount of overlap between the control edges and the limiting edges.

A further object of the invention is to provide a control valve wherein the valve slide is cylindrical and the control direction is along the axis of the valve slide. In this embodiment the control edges are circumferential edges of the grooves with the valve slide being movable by a selected amount of rotation to provide a selected amount of overlap between the circumferential control edges and the limiting edges of the port openings.

In a rotary or lengthwise slide system of the invention, ports may be provided having a square inside opening with limiting edges extending at angles between but exclusive of 0° and 90° relative to, the axis of the slide casing. A definite angular position of square ports may thus be used in either of these systems to obtain a flow rate verses displacement characteristics of a definite, even not strictly linear shape. At the same time, the limiting edges, for example and edges of the rectangular grooves may form any angle between 0° and 90° with the limiting edges of the square openings.

It is generally practical to use square or circular inside openings of the ports in the slide casing and corresponding grooves in the slide for adjusting other characteristics, particularly with a non-linear, monotonously increasing displacement.

A primary advantage of the invention is that the features relating to the arrangement and shape of the slide are applicable independently of each other, so that the respective effect on the flow rate-displacement characteristics or the flow force-flow rate characteristic is obtained with either of those features in and of themselves. However, they may be used in combination, without thereby reducing their combined effect.

Another advantage is an improved closed-loop control of the hydraulic circuits in which continuous control valves in accordance with the invention are employed as continually effective control elements. However, the continuous control is not the sole effect of this design. Due to the reduction of the flow force needed at the control edges of the valve and the simultaneously rising flow force-flow rate characteristic, the inventive control valve is actuated and produces its effect even upon a very small power input, so that in addition to the controlling effect, the amplification capacity of the valve is utilized as well.

A further object of the invention is to provide a continuous control valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is an axial sectional view of a lengthwise slide system comprising a casing with six square-opening ports and four circular-opening ports forming a four-way valve in parallel connection according to the invention;

FIG. 5a is an enlarged detail of FIG. 5 showing the relationship of a control edge and a limiting edge in closed valve position;

FIGS. 6 and 7 are cross sectional views of a system in accordance with FIG. 5, being in an open position;

DESCRIPTION OF THE PREFERRED EMBODIMENT

Figure 1:
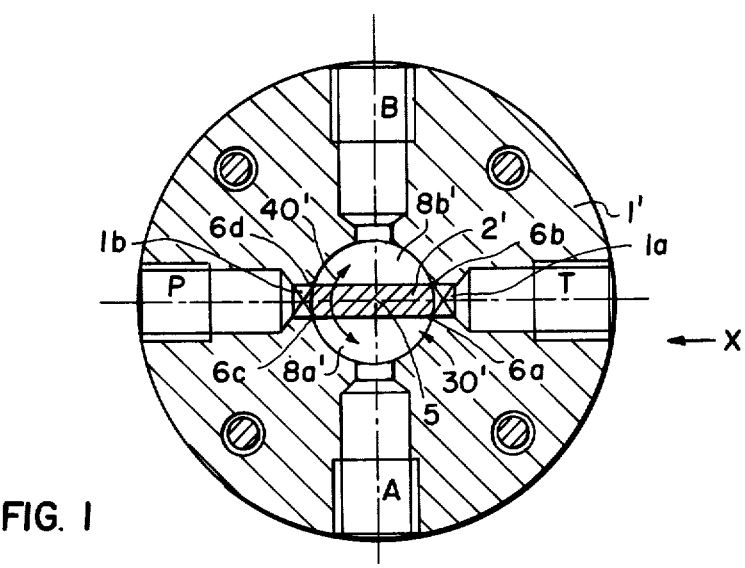
FIG. 1 is a sectional view of a rotary slide system comprising a casing with two square opening ports and two circular opening ports forming a four-way valve according to the invention.
Figure 2:
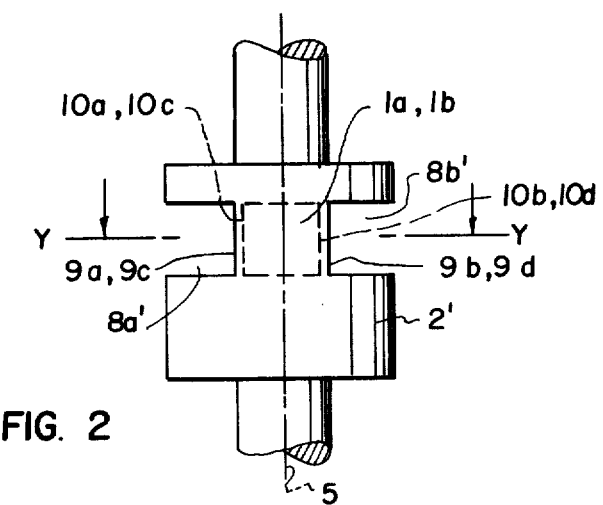
FIG. 2 is a side elevational view of a rotary slide alone used in the embodiment of FIG. 1.

Referring to the drawings in particular, the invention embodied therein, in FIGS. 1 to 4 comprise a rotary slide 2' rotatable in a casing 1' having four ports P,T,A and B extending through the wall thereof and at right angles to each other. Two pairs of ports are aligned with each other. In their portion adjacent the valve slide cavity 30' inside the casing 1', two of the ports (P and T) have their circular cross sections changed to square cross sections 1a, 1b by which they open into the cylindrical inside surface of casing 1' where slide 2' is received. The square inside openings of the ports enclose a rectangle, more particularly a square, and have four limiting edges of substantially equal length. These edges are in two parallel facing and opposite pairs for the two ports, designated 10a,10c, and 10b, and 10d (See FIG. 2). The slide 2' is movable (rotatable) in a control direction indicated by arrow 40'. Rotary slide 2' is provided with two diametrally opposite grooves 8a', 8b' having rectangular cross sections, as shown in FIG. 2. The end edges 9a, 9c and 9b, 9d of these grooves limit and define the groove length. These edges are equally long and they form the control edges which, in FIG. 1, are designated 6a, 6c and 6b, 6d. As shown in FIG. 2, the limiting edges 10a, 10c and 10b, 10d of the square openings are parallel to the casing axis 5. They also are parallel to the mentioned end edges 9a, 9c and 9b, 9d of the rectangular grooves, and are of equal length therewith.

Figure 3:
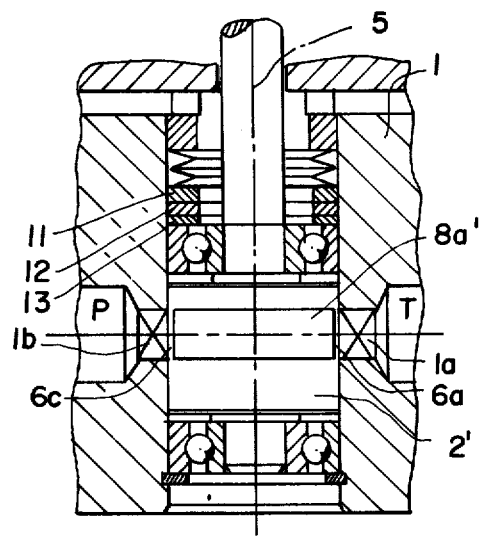
FIGS. 3 and 4 are axial sectional views each showing a continuous control valve comprising a rotary slide in accordance with FIGS. 1 and 2.
Figure 4:
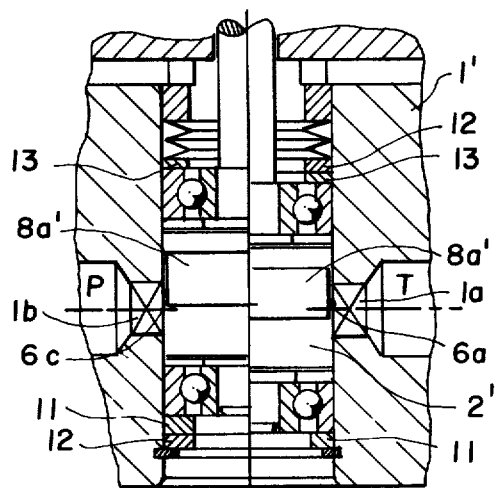

The central portion of rotary slide 2' (see FIG. 2) is reduced by the two opposite rectangular grooves 8a', 8b' to a web which is shown in FIG. 1 in section. FIG. 2 shows the rotary slide in a position in which the valve is closed, i.e. the supply of fluid through port P and its discharge through port T are blocked. In FIG. 3, the rotary slide 2' is shown in the same (closed) position and provided with two diametrally opposite rectangular grooves 8a', 8b' which have the same dimension as those of FIGS. 1 and 2. In FIG. 3, rotary slide 2' is shown in its orthodox operating position fixed by means of three spacer discs 11 to 13 which are inserted in the casing and surround the upper portion of the slide shaft. FIG. 4 shows other arrangements in which the rotary slide, upon being axially shifted, is fixed in two different, non-orthodox operating positions relative to ports P or T. This is done by means of two spacer discs 12 and 13 inserted above the central, grooved portion of the slide and one disc 11 below (right hand part of FIG. 4), or by means of one spacer disc 13 inserted above said portion and two spacer discs 11 and 12 inserted below said portion (left hand part of FIG. 4).

By comparing FIGS. 3 and 4, it becomes evident that in the non-orthodox, axially shifted operating position of the rotary slide, the effective lengths of control edges 6a, 6d and thus also those of control edges 6b, 6c which are not visible in these figures, are shorter than the corresponding lengths in the orthodox operating position in which these effective lengths are substantially equal to the actual full length of the edges.

The term "effective length" (i.e. effective in performing the continuous control function of the valve) is used to designate the total length of a control edge (6a, 6d or 6b, 6c) that overlaps the corresponding parallel limiting edge of an inside opening of a port (10a, 10d or 10b, 10c). This definition may also be applied in instances in which arcuate control edges and limiting edges oppose and are parallel to each other, or even where non-parallel, straight or arcuate control edges which oppose and cooperate with each other according to other embodiments of the invention.

Figure 8:
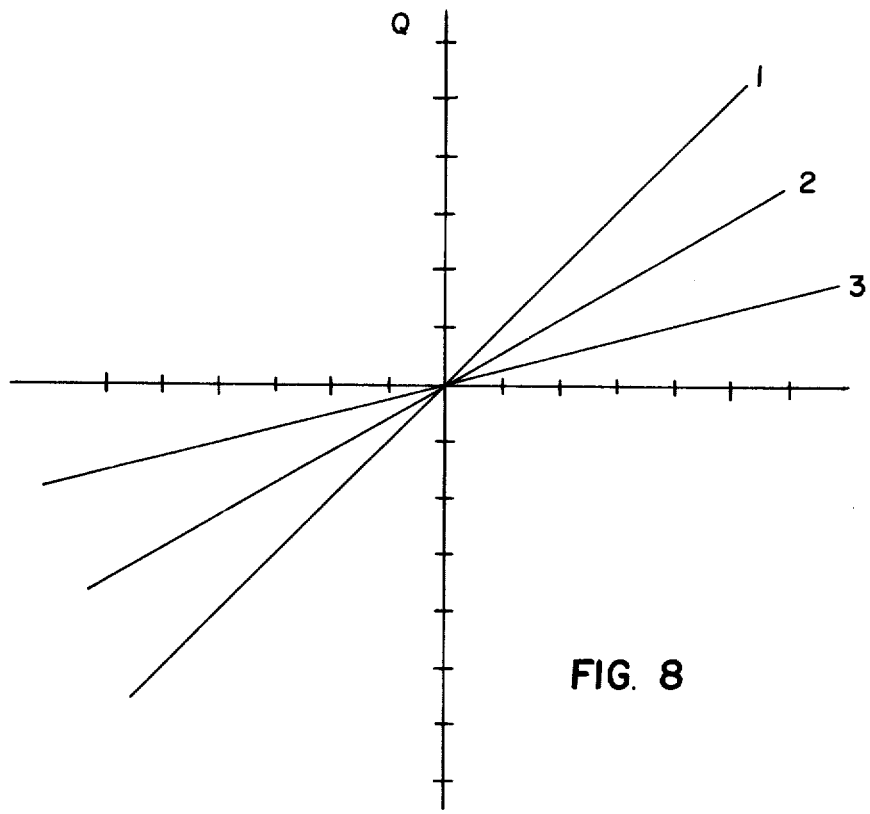
FIG. 8 is a graph showing the flow rate-displacement characteristic of a rotary and a lengthwise slide according to the invention.

In the last mentioned instances, the effective length is the projection of a portion of the designed total length of a control edge upon a portion of the corresponding limiting edge. In general, the effective length thus defined, of a control edge, depending on the controlling angular position of the rotary slide, and the stationary limiting edge of the inside opening of a port, determine together, in the manner of a diaphragm aperture, the size of the flow passage of the valve, thus the rate of flow. The more remote the fixed operating position of the rotary slide is from the orthodox operating position (in which the control edges produce their maximum effect), the smaller is the area of the mentioned flow passage and the controlled rate of flow. The relation between the rate of flow and the angular position of the rotary slide, which angular position is called displacement and is measured in the degrees of angle or arc lengths, is shown in FIG. 8 for three operating positions of the rotary slide. The three characteristics or curves 1 ɔ 3 in FIG. 8 are rather linear. Curve 1 characterizes .ie operation of the valve with the rotary slide in orthodox operating position in which the control edges have maximum effective lengths. The family of curves as shown is a parametric representation of the wide variety of flow rate controls which can be effected with a single valve in accordance with the invention.

In the foregoing, the invention has been explained with reference to a rotary slide. While applying the invention to a lengthwise or axial slide (see FIGS. 6,7), nothing changes in principle. In FIGS. 5–7, like elements are designated as in FIGS. 1 to 4.

The four-way valve for continuous control shown in FIG. 5 comprises a lengthwise slide 2 provided with two pairs of diametrally opposite rectangular grooves 8a, 8b. Again, the slide is shown in its position shutting the valve off. In this position, the square inside openings of ports P, P and T, T are closed by the non-grooved portions of the slide surface, while parts A,A and B,B thus the connections to and from the operated devices (not shown), communicate with each other through the rectangular grooves. One pair of opposite limiting edges 10c, 10d of the square inside port opening 1b extends perpendicularly to the axis 5 of slide casing 1, These edges (unlike in the rotary slide valve) cooparate to control edges 6c and 6d which, in the lengthwise slide, are formed by arcuate portions of the circumferential edges 9c and 9d of the slide (see detail of FIG. 5 and FIGS. 6,7) by which the grooves are limited in their length and which therefore are the end edges of the grooves.

In FIG. 6, lengthwise slide 2 is shown in its orthodox operating position in which the controlling displacement (of the slide, i.e. the displacement in accordance with FIG. 8) is effected in the axial direction of the casing. In FIG. 7 the lengthwise slide is shown in an operating position which is angularly offset relative to the orthodox one. It is evident that in this operating position, the effective length of control edges 6c are shorter than in the orthordox operating position according to FIG. 6, where the control edge has its maximum effective length. This is the case in any operating position reached by the lengthwise slide being turned out of the orthodox operating position. In the adjusted operating position, lengthwise slide 2 is fixed in casing 1 by suitable locking means to secure the slide against rotation without hindering its controlling mobility in the axial direction of casing 1. In FIG. 8, the characteristics 1 to 3 which are almost straight lines, are obtained if the lengthwise slide of one and the same inventive valve is fixed in three different operating positions. This fully corresponds to what is explained above in connection with a rotary slide.

Figure 9:
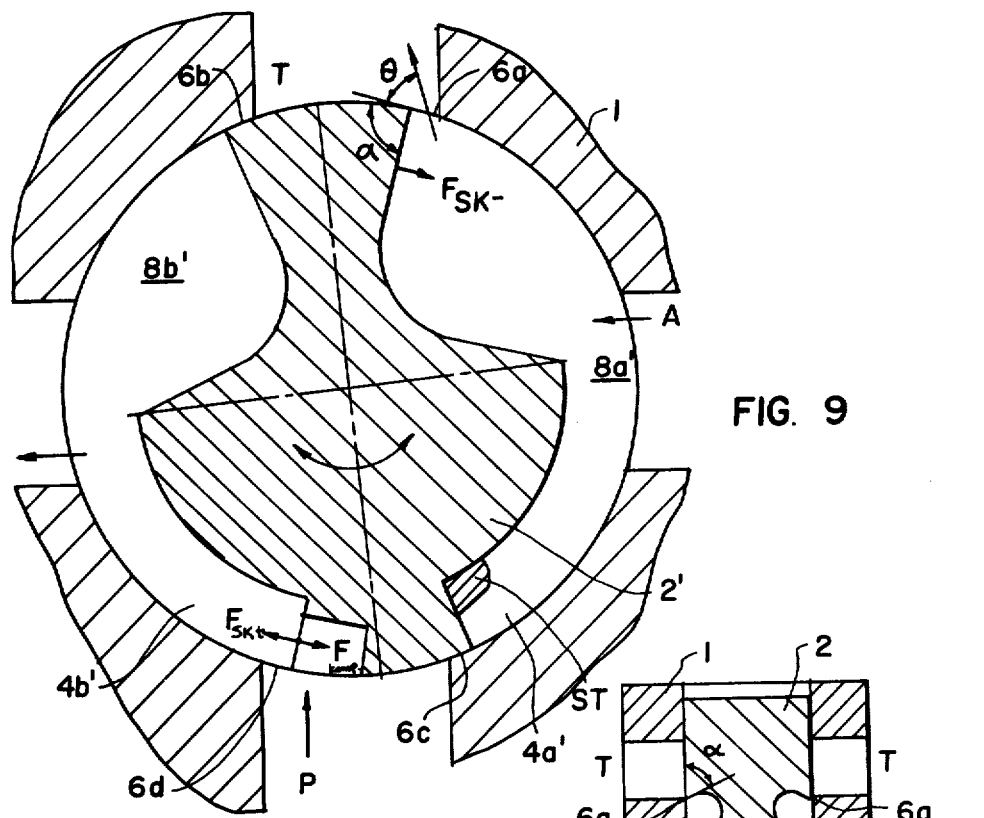
FIG. 9 is a cross-sectional view of an inventive rotary slide in a corresponding casing.
Figure 10:
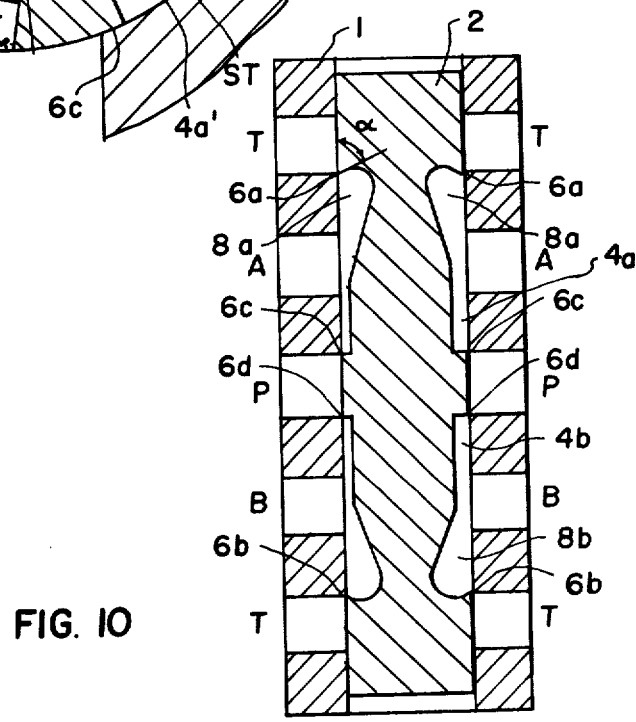
FIG. 10 is an axial sectional view of an inventive lengthwise slide in a corresponding casing.
Figure 11:
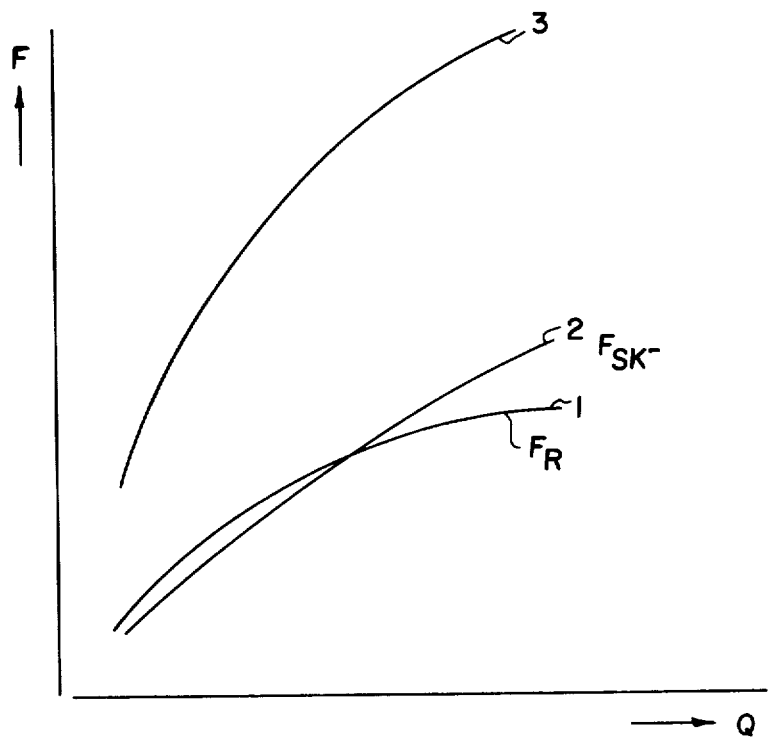
FIG. 11 is a graph showing the flow force-flow rate characteristic according to the invention.

Referring now to FIGS. 9 to 11, the inventive features relating to the shape or cross section of a rotary slide (FIG. 9) or lengthwise slide (FIG. 10) are illustrated. Due to the shape of the slides shown the flow force in the flow sectors (of the zones 4a', 4b' or 4a, 4b; grooves 8a', 8b' or 8a, 8b; between ports P as flow entrance and B or A, the zones of the grooves between ports A or B and T as flow exit) are changed in such a way that with a small flow force (curve 3 in FIG. 11), the flow force-flow rate characteristic still rises monotously even at a high rate of flow. This shape is substantially identical for both a rotary and a lengthwise slide and is provided in the bottom of each of the associated rectangular grooves, or otherwise formed grooves. The shape is determined in the following way:

Downstream of each of the control edges 6c, 6d at the flow entrance P (plus-control edges) a narrow zone or channel 4a, 4b, 4a', 4b' starts in which the flow causes a pressure drop, so that a compensation force $F_k$ builds up counteracting the flow force $F_{SK+}$ acting on the control edges in the valve-closing direction so that as a function of the rate of flow Q, the resultant $F_R$ of these forces shows the shape indicated by curve 1 in FIG. 11. With the position of slides 2', 2 shown in FIGS. 9 and 10, the mentioned channel ends in the zone of the inside opening of ports A or B. This is followed by a recess or bay in the bottom of grooves 8a, 8b or 8a', 8b'. In front of each of the control edges 6a, 6b, this recess terminates by a steep slope, so that at the control edge, the bottom surface of the grooves and the tangential plane of the non-grooved cylindrical outer surface of the slide form an angle $a$ in the range of 0° to 90°. The groove surface thus extends in a direction to increase the size of each groove near the parts T.The shape given to the slides at the flow exit T produces the effect that in the inside opening of the respective port, a flow angle $\theta$ between the mean outflow direction and the mentioned tangential plane is sufficiently large already at small rates of flow Q, but smaller than 90°, so that the flow force $F_{SK-}$ at the minus control edge 6a, 6b is small, and that with an increasing rate of flow Q, the flow angle $\theta$ increases, so that the flow force $F_{Sk}$ increases far less than in proportion to Q, in accordance with the shape of curve 2 in FIG. 11. The flow force-flow rate characteristic of the continuous control valve comprising a rotary slide or lengthwise slide and having a cross-sectional shape as described in the foregoing, is obtained by point by point addition of curves 1 and 2 to form curve 3 which rises monotonously within a wide range of the rates of flow Q. This characteristic may then further be varied without changing its character, by varying the depths of channels 4a, 4b, 4a', 4b' and also by providing a small step st as shown, behind the plus control edge 6c, 6d.

While specific embodiments of the invention have been shown and described in detail to illustrate the application of the principles of the invention, it will be understood that the invention may be embodied otherwise without departing from such principles.

What is claimed is:

1. A continuous control valve comprising:
   a casing having a valve slide cavity and a plurality of ports each with an opening communicating with said cavity, each port opening bounded by a plurality of limiting edges, at least one of said ports comprising an inlet port, at least one of said ports comprising an outlet port and at least one of said ports comprising an additional port extending in said casing;
   a valve slide movable in said cavity in a control direction to vary a flow passage cross-sectional area in each port opening, said slide having a plurality of grooves each with a rectangular cross-section in a plane transverse to a plane containing said control direction, a plurality of control edges transverse to said control direction and a plurality of connecting edges connecting ends of said control edges, said slide movable in said control direction to move said control edges with respect to at least some of said limiting edges;
   said slide positionable in said cavity at a selected position in a direction transverse to said control direction to establish a selected amount of overlap between said control edges and said at least some limiting edges;
   each groove being shallow in the vicinity of said inlet and said outlet port openings and deeper in the vicinity of openings of said additional port, each groove having a groove surface extending at an acute angle (α) with respect to an outer surface of said valve slide in the vicinity of said additional port opening, said groove surface extending in a direction to enlarge each groove in the vicinity of said additional port opening.

2. A continuous control valve according to claim 1, wherein said cavity is cylindrical, said valve slide is cylindrical and said openings of said inlet and outlet ports are polygonal in shape.

3. A continuous control valve according to claim 1, wherein each of said ports extends through said casing and is circular in cross-section at a location spaced from said cavity and polygonal in cross-section in the vicinity of said cavity and in each port opening.

4. A continuous control valve according to claim 3, wherein each port opening is rectangular in shape.

5. A continuous control valve according to claim 2, wherein said control edges of said valve slide groove extend parallel to an axis of said cylindrical valve slide, at least two limiting edges of each port opening extending parallel to said axis.

6. A continuous control valve according to claim 5, wherein said limiting edges of said port openings each define a square.

7. A continuous control valve according to claim 2, wherein said control edges of said valve slide grooves comprise circumferential segments, said control direction comprising movement of said valve slide is parallel to said valve slide axis.

8. A continuous control valve according to claim 7, wherein each of said grooves is diametrically opposed to each other on said valve slide.

9. A continuous control valve according to claim 5, wherein said control direction is in a direction of rotation of said cylindrical slide valve, said grooves positioned on diametrically opposed sides of said cylindrical valve slide.

10. A continuous control valve according to claim 1, including a step formed in one of said grooves adjacent said inlet port opening.

11. A continuous control valve according to claim 1, wherein each groove varies in degree of shallowness across the opening of said additional ports.

* * * * *